(12) United States Patent
Phan

(10) Patent No.: US 11,773,606 B2
(45) Date of Patent: Oct. 3, 2023

(54) FLIP DOOR-TO-GUARDRAIL

(71) Applicant: The Boeing Company, Chicago, IL (US)

(72) Inventor: Tuan-Vu T. Phan, Kent, WA (US)

(73) Assignee: The Boeing Company, Arlington, VA (US)

(*) Notice: Subject to any disclaimer, the term of this patent is extended or adjusted under 35 U.S.C. 154(b) by 884 days.

(21) Appl. No.: 16/515,425

(22) Filed: Jul. 18, 2019

(65) Prior Publication Data
US 2021/0017774 A1 Jan. 21, 2021

(51) Int. Cl.
| | | |
|---|---|---|
| *E04G 5/14* | (2006.01) | |
| *B64F 5/10* | (2017.01) | |
| *E04G 21/32* | (2006.01) | |
| *E04G 1/00* | (2006.01) | |

(52) U.S. Cl.
CPC .............. *E04G 5/14* (2013.01); *B64F 5/10* (2017.01); *E04G 21/3228* (2013.01); *E04G 1/00* (2013.01)

(58) Field of Classification Search
CPC . E04G 5/14; E04G 21/3228; E04G 2001/155; E04F 11/1865
See application file for complete search history.

(56) References Cited

U.S. PATENT DOCUMENTS

| | | | | |
|---|---|---|---|---|
| 4,266,380 | A * | 5/1981 | Samolis | E02D 29/1463 404/25 |
| 8,365,472 | B2 * | 2/2013 | Grimaldi | B63B 17/04 114/364 |
| 8,522,487 | B2 * | 9/2013 | Whiting | E06C 7/182 52/72 |
| 9,067,646 | B2 * | 6/2015 | Admire | B63B 7/04 |
| 9,677,249 | B2 * | 6/2017 | Holcomb | E02F 9/0833 |
| 9,745,762 | B2 * | 8/2017 | Moran | E04F 11/1865 |
| 9,957,016 | B2 * | 5/2018 | Grimaldi | B63B 17/04 |
| 10,260,285 | B2 * | 4/2019 | Kim | E04F 11/062 |
| 10,724,257 | B2 * | 7/2020 | Moran | E04G 5/142 |
| 10,730,372 | B2 * | 8/2020 | Roth | B60P 1/435 |
| 10,780,830 | B2 * | 9/2020 | Oliver | B60R 3/005 |
| 10,780,831 | B2 * | 9/2020 | Oliver | B60R 3/005 |
| 11,142,913 | B2 * | 10/2021 | Noohi | E04B 1/003 |
| 11,156,008 | B2 * | 10/2021 | Phan | B64F 5/60 |
| 2008/0296922 | A1 * | 12/2008 | Diamond | B60P 3/34 296/26.13 |

* cited by examiner

*Primary Examiner* — Colleen M Chavchavadze
(74) *Attorney, Agent, or Firm* — McDonnell Boehnen Hulbert & Berghoff LLP

(57) ABSTRACT

The present disclosure relates systems and methods involving movable/adjustable platforms and/or guardrails. An example system includes a bracket configured to be coupled to a fixed structure having a walking surface. The system also includes a flip door portion rotatably coupled to the bracket and a guardrail portion rotatably coupled to the flip door portion. The system includes a linkage further coupling the flip door portion to the guardrail portion. The system yet further includes an actuator configured to controllably adjust a configuration of the flip door portion, the linkage, and the guardrail portion between an extended configuration and a retracted configuration with respect to the walking surface.

20 Claims, 14 Drawing Sheets

Retracted Configuration

Retracted Configuration

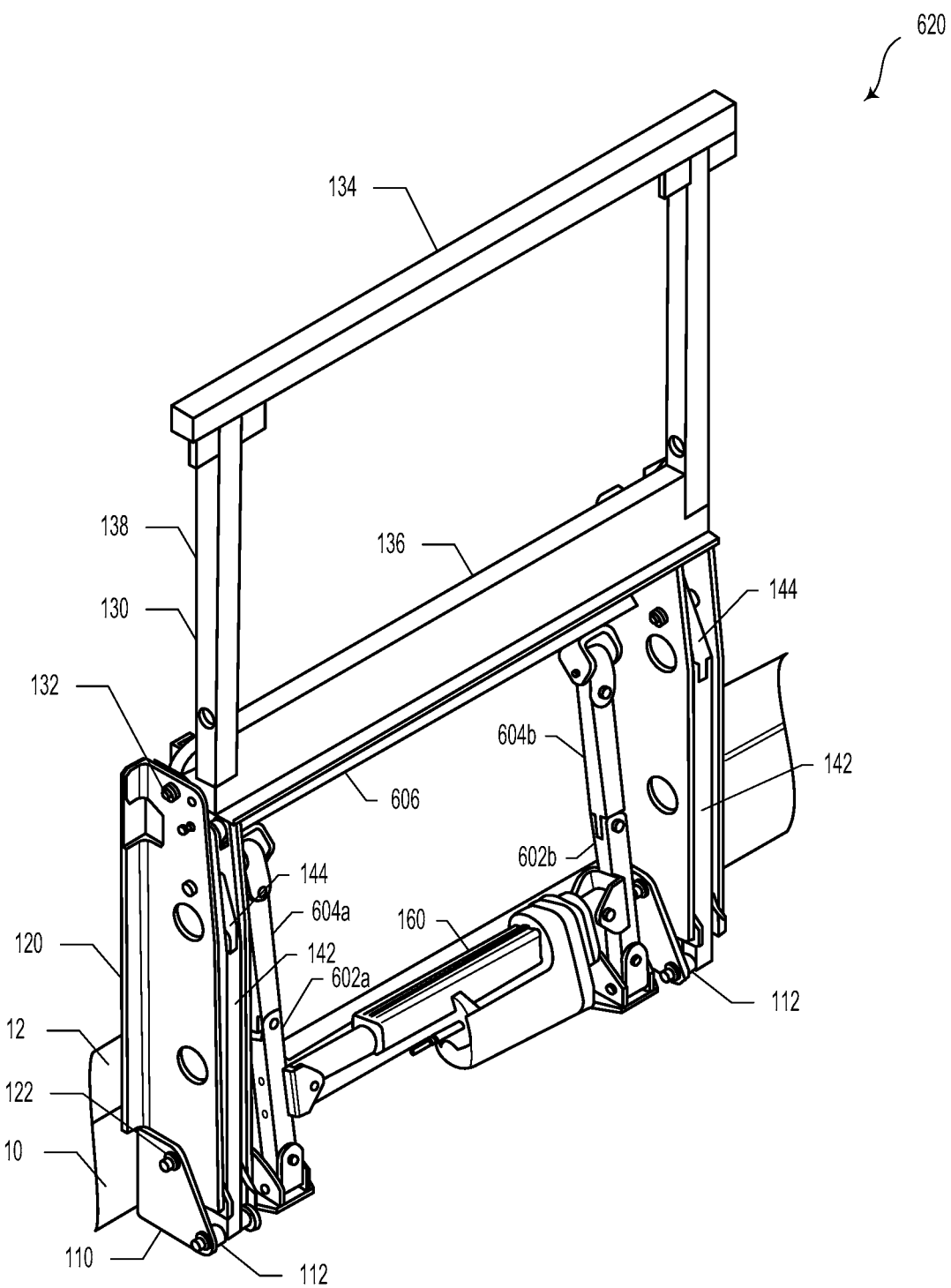
Figure 6B  Retracted Configuration

FLIP DOOR-TO-GUARDRAIL

FIELD

The present disclosure generally relates to systems and methods involving adjustable walkway platforms and/or movable guardrails.

BACKGROUND

During their manufacture in an airplane production facility, aircraft move along the production line between different stages of assembly. This periodic (e.g., daily) movement is called "pulsing" the production line.

In some stages of assembly, personnel may access elevated portions of the aircraft by way of fixed deck platforms positioned within a few feet from the respective sides of the aircraft's fuselage. In such scenarios, movable deck platforms (e.g., flip doors) may be coupled to the fixed deck platforms and may be operable to provide personnel with the remaining platform access up to the body of the aircraft.

Prior to pulsing the production line, the movable deck platforms may be manually rotated (e.g., raised upward or lowered downward away from the fuselage) so as to provide sufficient clearance for airplane movement along the production line. To avoid falls from the fixed deck platform at this stage, removable guardrails can be manually installed near the end of the fixed deck platform.

Once a new airplane is in a proper position along the production line, the guardrails may be manually removed and the movable deck platform could be reinstalled or rotated to a horizontal position to once again close the gap between the fixed deck platform and the aircraft fuselage and provide standing access for personnel immediately next to the fuselage.

Frequent handling of the removable guardrail sections, which can weigh 40 pounds or more, can lead to repetitive lift injuries. Furthermore, personnel who install and remove the guardrails can be at particular risk of falling or dropping the guardrails.

SUMMARY

In an aspect, a system is described. The system includes a bracket configured to be coupled to a fixed structure having a walking surface. The system also includes a flip door portion rotatably coupled to the bracket and a guardrail portion rotatably coupled to the flip door portion. The system also includes a linkage further coupling the flip door portion to the guardrail portion. The system additionally includes an actuator configured to controllably adjust a configuration of the flip door portion, the linkage, and the guardrail portion between an extended configuration and a retracted configuration with respect to the walking surface.

In another aspect, a deck platform is described. The deck platform includes a fixed deck platform portion having a walking surface. The deck platform also includes a movable deck platform portion. The movable deck platform portion includes a bracket coupled to the fixed deck platform portion, a flip door portion rotatably coupled to the bracket, and a guardrail portion rotatably coupled to the flip door portion. The movable deck platform portion includes a linkage further coupling the flip door portion to the guardrail portion and an actuator configured to controllably adjust a configuration of the flip door portion, the linkage, and the guardrail portion between an extended configuration and a retracted configuration with respect to the walking surface.

In a further aspect, a method is described. The method includes receiving, from a remote unit, information indicative of a desired configuration or a desired movement of a flip door portion and a guardrail portion with respect to a walking surface of a deck platform. The flip door portion is rotatably coupled to a bracket attached to the deck platform and the guardrail portion is rotatably coupled to the flip door portion. The method also includes determining, based on the received information, that the desired configuration or the desired movement includes at least one of an extended configuration or a retracted configuration with respect to the walking surface. The method yet further includes moving the flip door portion and the guardrail portion according to the desired configuration or the desired movement.

Other aspects, examples, and implementations will become apparent to those of ordinary skill in the art by reading the following detailed description with reference, where appropriate, to the accompanying drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 6B illustrates the system of FIG. 1, according to an example implementation.

DETAILED DESCRIPTION

I. Overview

Figure 1:
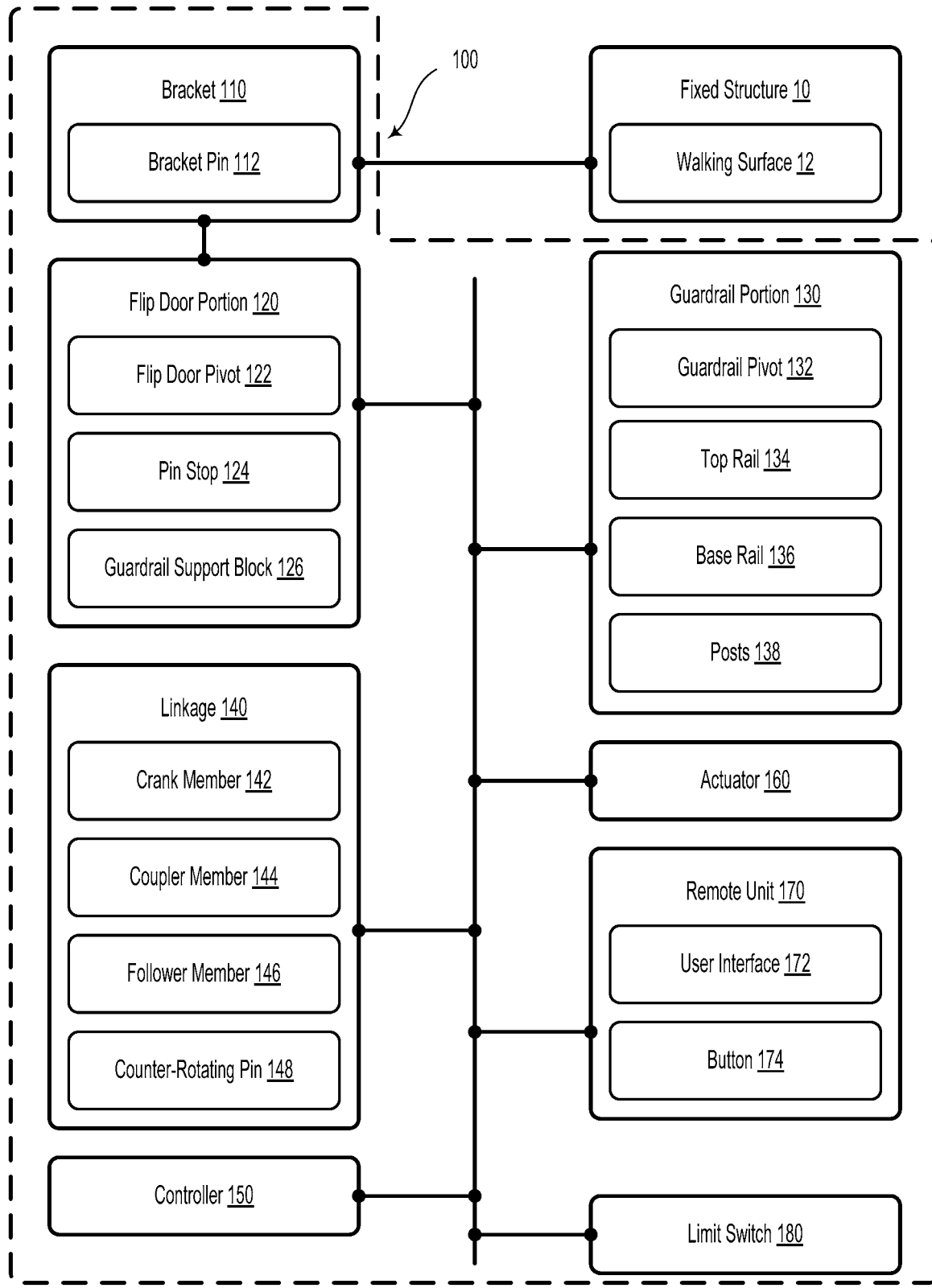
FIG. 1 illustrates a system, according to an example implementation.

Example methods, devices, and systems are described herein. It should be understood that the words "example" and "exemplary" are used herein to mean "serving as an example, instance, or illustration." Any example or feature described herein as being an "example" or "exemplary" is not necessarily to be construed as preferred or advantageous over other examples or features. Other examples can be utilized, and other changes can be made, without departing from the scope of the subject matter presented herein.

Thus, the examples described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall examples, with the understanding that not all illustrated features are necessary for each example.

The present disclosure relates to a flip door with an integrated guardrail that can retract and extend in an automated fashion without exposing personnel to injury risks. The systems and methods described herein could be implemented in an airplane production facility or in other similar environments. In such examples, tooling personnel can remotely retract and extend the flip door and integrated guardrail before and after pulsing of the production line instead of manually rotating the flip door and/or lifting, carrying, and installing guardrails onto the fixed deck platform.

In some embodiments, the flip door could rotatably extend (e.g., rotate down) so as to be parallel with the fixed deck surface. Furthermore, the flip door can rotatably retract (e.g., rotate up) so as to prevent personnel falling off the fixed deck platform during pulsing. When the flip door portion retracts, the integrated guardrail portion may rotate upward so as to vertically extend the physical barrier to personnel. In some embodiments, one or more electric linear actuators may be arranged so as to rotate the flip door portion and guardrail portion in an automated manner. In such scenarios, the flip door (and integrated guardrail) could be extended and retracted using an automated control system that may be controlled with a remote control.

In some embodiments, a flip door-to-guardrail system could include 2 main elements, a flip door portion and a guardrail portion. The flip door portion is raised and lowered by an electric linear actuator or a hydraulic or pneumatic air cylinder. The guardrail portion is raised up or pulled down by linkages that couple the flip door portion to the guardrail portion. Flip door brackets may be used to affix the flip door portion to the fixed deck platform. In some embodiments, various elements of the flip door-to-guardrail system could be formed from steel and/or aluminum. Other materials are contemplated and possible as well.

In some embodiments, the flip door portion could support from 25-60 lbs/square foot uniform load. While the flip door is extended (e.g., lowered or flat), the linkages and guardrail portion may be hidden within indentations in the flip door portion. When raising the flip door, the linkages will push the guardrail portion up to form a physical barrier to personnel. Furthermore, when lowing the flip door portion down, the linkages will pull the guardrail portion down to be flush with the flip door platform surface.

A guardrail support block is welded between arm members to support approximately 200 lbs. of force from the top of guardrail portion. A counter-rotating pin is installed on the linkage arm and locked on the flip door arm to prevent the guardrail portion from rotating when in a raised position. In some embodiments, the guardrail portion, the flip door portion, the linkages, and the actuator are joined by steel pins.

Furthermore, in some embodiments, the flip door portion may also act as a toe board when raised.

In some embodiments, the flip door-to-guardrail system described herein could be intended to comply with various federal and state safety guidelines, such as, but not limited to, current Occupational Safety and Health Administration (OSHA) Regulation 1910.29 (Fall protection systems) (See e.g., Federal Register Volume 81, Issue 223, Nov. 18, 2016). Other current and future United States and international safety standards could be addressed by way of the present flip door-to-guardrail system as well.

II. Example Systems

FIG. 1 illustrates a system 100, according to an example implementation. System 100 includes a bracket 110 configured to be coupled to a fixed structure 10 having a walking surface 12. The various elements of system 100 could be formed from round and/or square metal tubing, rods, pins, or bars. Some elements of system 100 could be formed from L- or C-shaped metal (e.g., angle or channel structural materials). Additionally or alternatively, the various elements of system 100 could be formed from one or materials such as aluminum, steel, and/or another material. Furthermore, it will be understood that such parts could additionally or alternatively be formed from machined parts.

System 100 also includes a flip door portion 120 rotatably coupled to the bracket 110. In some embodiments, the flip door portion 120 is rotatably coupled to the bracket 110 at a flip door pivot 122.

As described herein, elements that are "rotatably coupled" to one another could be coupled by way of a pin, a rotary bearing; or at least one rotary bushing and a stripper bolt. Other types of flexible and/or adjustable couplings are contemplated to join the relevant elements in a rotatable fashion. For example, it will be understood that other types of rotatable couplings are contemplated herein. Without limitation, elements of system 100 could be rotatably coupled to one another by way of a straight or articulated axle, a clevis pin, a plain bearing (e.g., sleeve bearing/bushing), a ball bearing, or roller bearing, among other possibilities.

System 100 additionally includes a guardrail portion 130 rotatably coupled to the flip door portion 120 at a guardrail pivot 132. In some embodiments, the guardrail portion could include a top rail 134, a base rail 136, and a plurality of posts 138. In such scenarios, the posts 138 could be coupled to the top rail 134 and the base rail 136.

System 100 yet further includes a linkage 140 further coupling the flip door portion 120 to the guardrail portion 130. In some embodiments, the linkage 140 is rotatably coupled to the bracket 110 by way of the at least one bracket pin 112.

In example embodiments, the linkage 140 could include a crank member 142, a coupler member 144, and a follower member 146. In such a scenario, a first crank member end is rotatably coupled to the at least one bracket pin 112. Additionally, a second crank member end is rotatably coupled to a first coupler member end. A second coupler member end is rotatably coupled to a first follower member end. The coupler member 144 is rotatably coupled to the flip door portion 120 at an intermediate pivot between the first coupler member end and the second coupler member end. In such examples, a second follower member end is rotatably coupled to the guardrail portion 130.

In some embodiments, the linkage 140 may include a counter-rotating pin 148. In such scenarios, the flip door portion 120 could include at least one pin stop 124. While in the retracted configuration, the counter-rotating pin 148 could be configured to engage the pin stop 124.

System 100 also includes an actuator 160. The actuator 160 is configured to controllably adjust a configuration of the flip door portion 120, the linkage 140, and the guardrail portion 130 between an extended configuration and a retracted configuration with respect to the walking surface 12.

In some embodiments, the actuator 160 could include an electric ball-screw linear actuator comprising an actuator arm with a throw range between 100 mm to 300 mm. Other throw ranges are possible and contemplated. Furthermore, other types of linear actuators are possible and contemplated, including, without limitation, pneumatic actuators, rotary actuators, or hydraulic actuators.

In example embodiments, a first end of the actuator 160 is coupled to the bracket 110 by way of an actuator base weldment. A second end of the actuator is coupled to an actuator pivot of the flip door portion 120. Furthermore, the actuator 160 could be communicatively coupled to a controller 150 and/or a remote unit 170. It will be understood that other arrangements of the actuator 160 with respect to the flip door portion 120, the fixed structure 10, and the bracket 110 are possible and contemplated so as to controllably adjust the configuration of elements of system 100 as described herein.

In some embodiments, the walking surface 12 could define a reference plane. In such scenarios, the extended configuration could include the flip door portion 120 extending substantially parallel along the reference plane and the guardrail portion 130 being stowed substantially flush with respect to a top surface of the flip door portion 120.

Additionally or alternatively, the retracted configuration could include the flip door portion 120 disposed substantially perpendicular to the reference plane and the guardrail portion 130 extending away from the flip door portion 120.

In some embodiments, system 100 could include a guardrail support block 126. As illustrated in FIG. 1, the guardrail support block 126 could be coupled to the flip door portion 120. However, the guardrail support block 126 could be located elsewhere. The guardrail support block 126 could be configured to engage a base portion of the guardrail portion 130 while in the retracted configuration so as to prevent rotation of the guardrail portion 130 in at least one direction.

The system 100 could further include a remote unit 170 configured to control a position of the actuator 160. The remote unit 170 could include a wired remote controller having a user interface 172. The user interface 172 could include at least one button 174.

In some embodiments, a user could press the at least one button 174 to provide a command to extend or retract the system 100. For instance, the remote unit 170 could include an "EXTEND" button and a "RETRACT" button. User interactions with such buttons could provide corresponding commands to the actuator 160 and/or controller 150 to adjust a position of the flip door portion 120, the linkage 140, or the guardrail portion 130.

In some embodiments, system 100 could include a controller 150. The controller 150 could include a computer, or another type of microcontroller configured to execute instructions so as to carry out various operations. For example, the controller 150 may include one or more processors and at least one memory. The processor(s) may include, for instance, a microprocessor, an application-specific integrated circuit (ASIC), or a field-programmable gate array (FPGA). Other types of processors, circuits, computers, or electronic devices configured to carry out software instructions are contemplated herein.

The memory may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors of controller 150 may be configured to execute instructions stored in the memory so as to carry out various operations and method steps/blocks described herein. The instructions may be stored in a permanent or transitory manner in the memory.

In some embodiments, the operations could include, responsive to receiving information indicative of an extension command, causing the actuator 160 to move the flip door portion 120, the linkage 140, and the guardrail portion 130 into the extended configuration.

The operations could additionally include, responsive to receiving information indicative of a retraction command, causing the actuator 160 to move the flip door portion 120, the linkage 140, and the guardrail portion 130 into the retracted configuration.

In other words, the instructions could relate to operations, such as, responsive to receiving information indicative of an extension command, causing the actuator 160 to move the flip door portion 120 and the guardrail portion 130 into the extended configuration. This is beneficial because the controller-based operations could take the place of, supplement, or make safer manual tasks during aircraft assembly line pulsing activities. Namely, instead of using personnel to manually replace guardrails, the flip door portion 120 and the guardrail portion 130 could be automatically or semi-automatically rotated into the extended configuration with the systems and methods described herein.

Furthermore, the operations could include, responsive to receiving information indicative of a retraction command, causing the actuator 160 to move the flip door portion 120 and the guardrail portion 130 into the retracted configuration. Similar to the benefits stated above, this operation is beneficial because it could replace or reduce the need for personnel to manually remove and/or replace guardrails from the deck platform during pulsing operations. Furthermore, such controller-based (e.g., automated or semi-automated) operations could prevent injuries to worker personnel, such as repetitive-use injuries and falls.

In some embodiments, the system 100 could include at least one limit switch 180. The at least one limit switch 180 could be configured to provide information indicative of the flip door portion 120, the linkage 140, or the guardrail portion 130 reaching a position limit. In such scenarios, causing the actuator 160 to move the flip door portion 120, the linkage 140, and the guardrail portion 130 could include moving the flip door portion 120, the linkage 140, and the guardrail portion 130 until receiving the information indicative of the flip door portion 120, the linkage 140, or the guardrail portion 130 reaching the position limit.

The at least one limit switch 180 could include a switch, button, or another type of sensor. The at least one limit switch 180 could operate based on mechanical, opto-mechanical, magnetic, or optical sensing modalities. However, other types of limit switches or contact/proximity sensors are possible and contemplated.

Figure 2A:
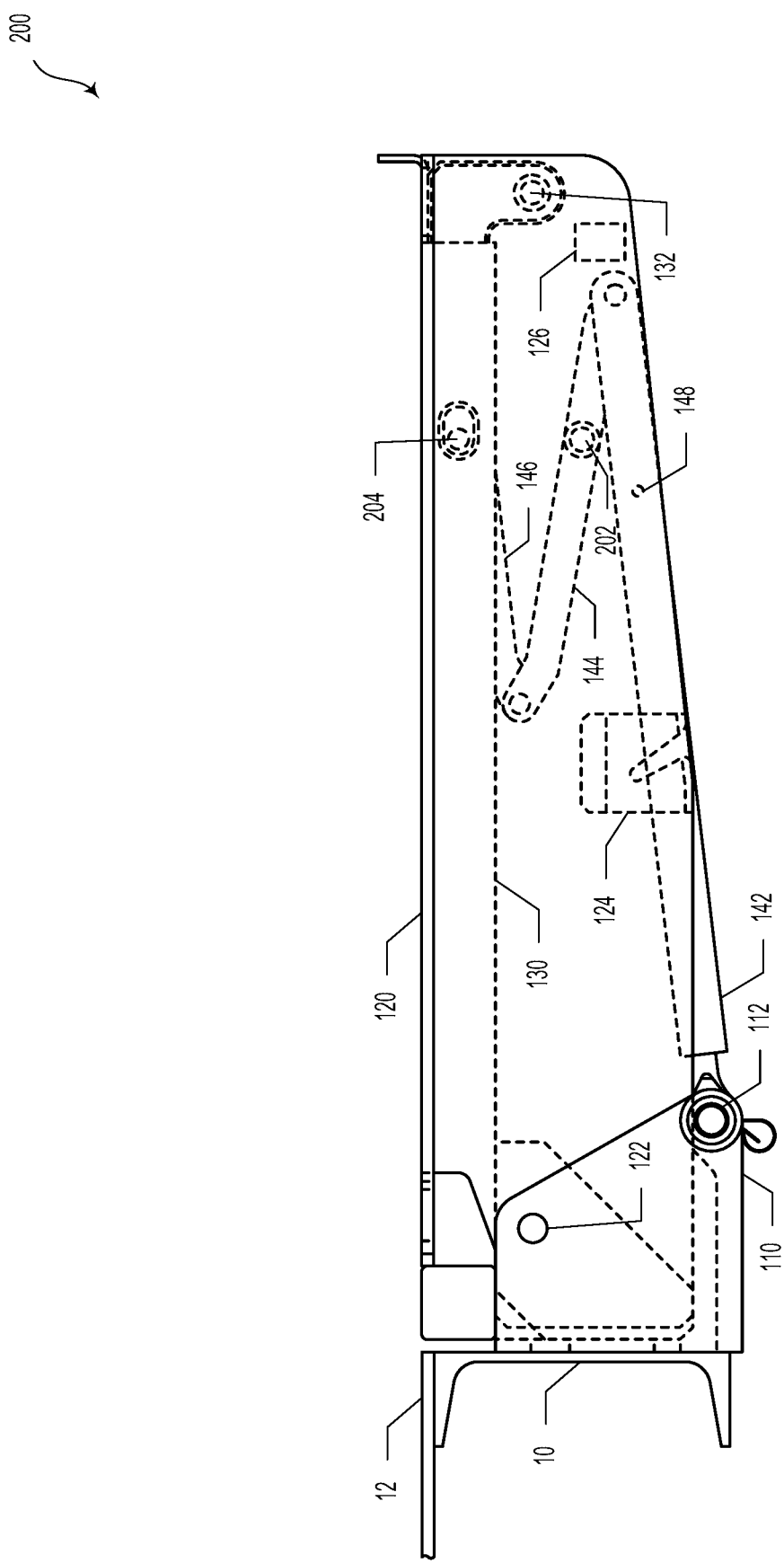
FIG. 2A illustrates the system of FIG. 1, according to an example implementation.
Figure 2B:
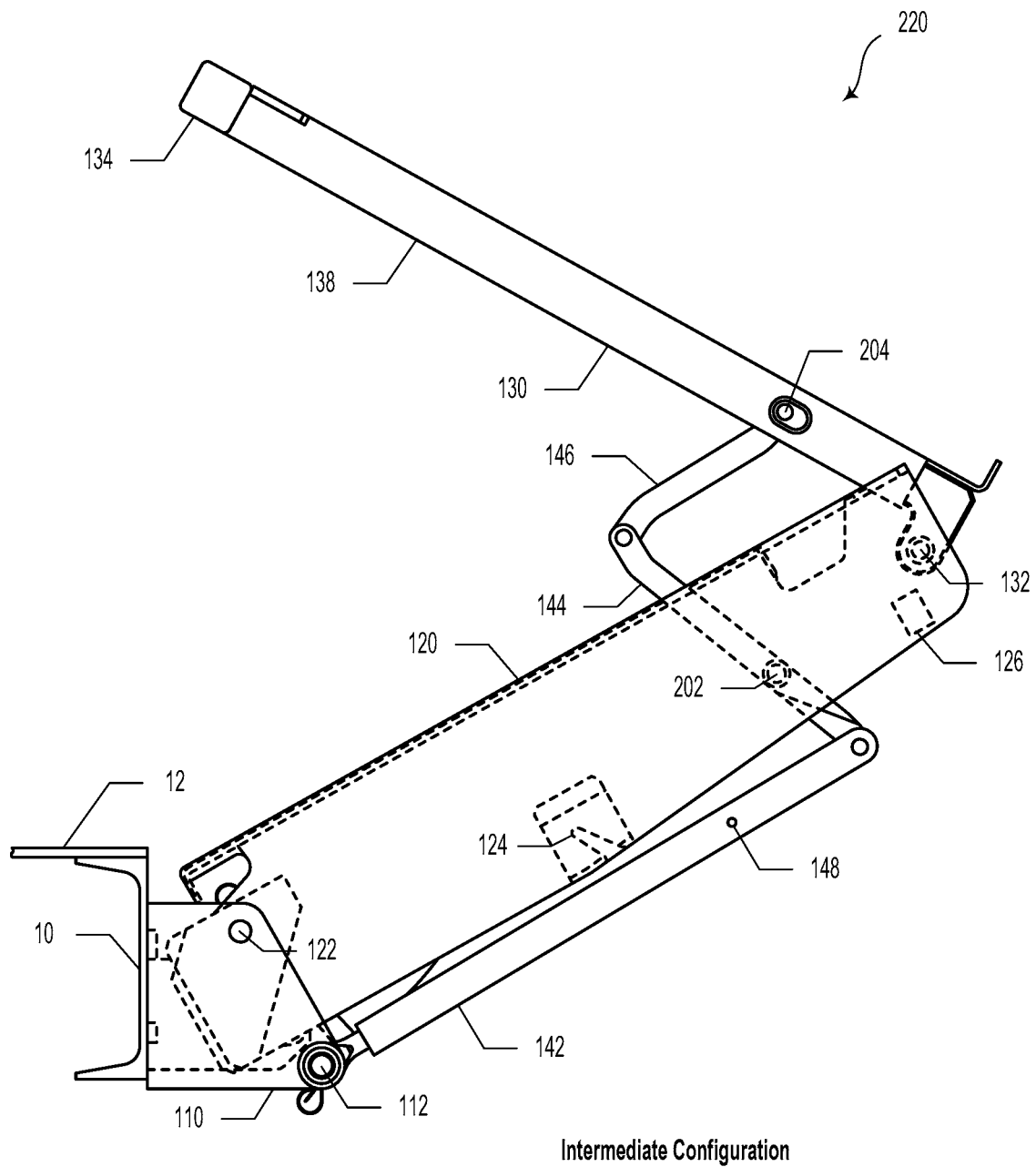
FIG. 2B illustrates the system of FIG. 1, according to an example implementation.
Figure 2C:
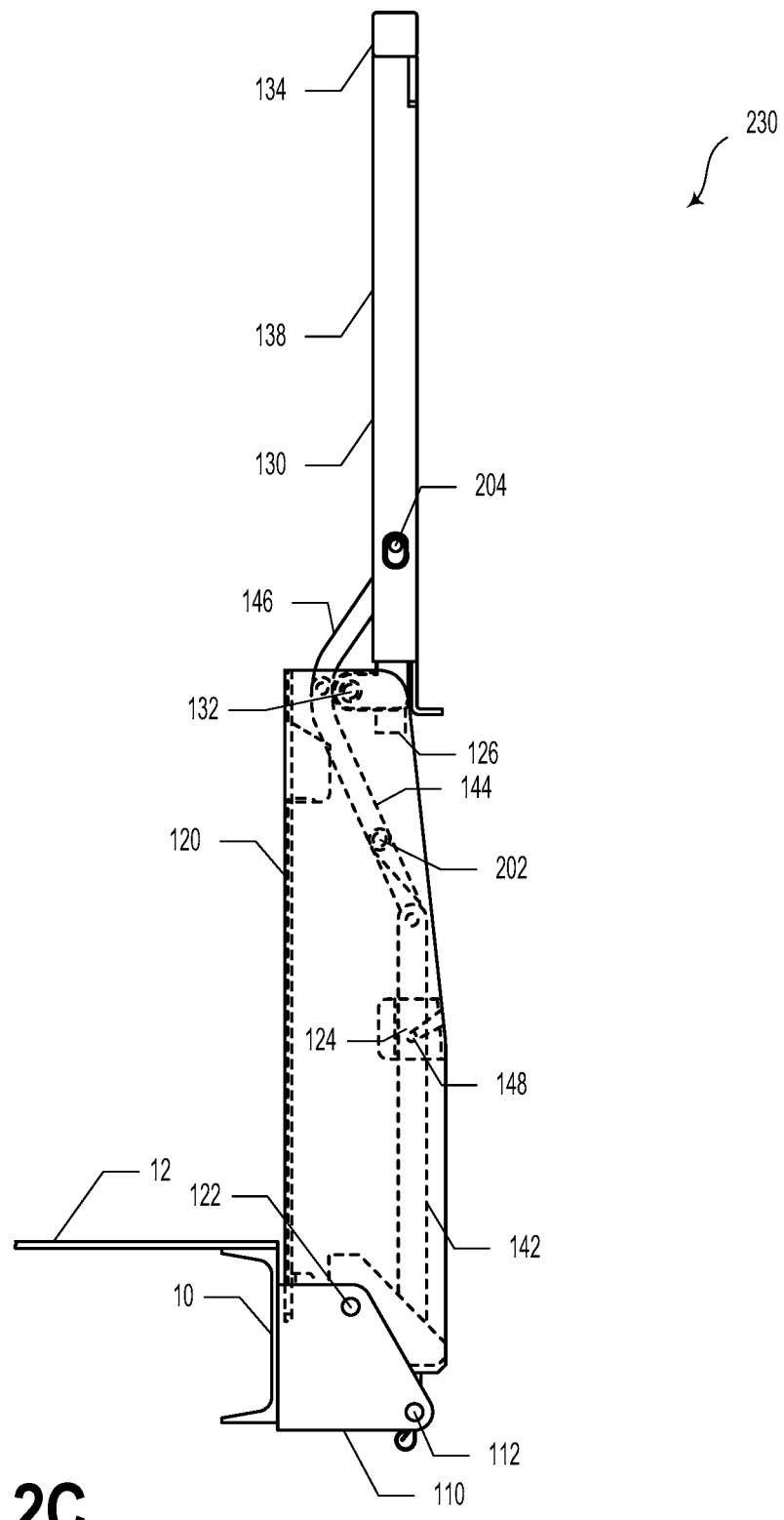
FIG. 2C illustrates the system of FIG. 1, according to an example implementation.

FIGS. 2A-2C illustrate various operating scenarios involving the system 100, as illustrated and described in reference to FIG. 1. For clarity, only a subset of the total structures of the system 100 are specifically numbered in FIGS. 2A-2C. Other Figures will provide further details about the arrangement of elements of system 100.

FIG. 2A illustrates an operating scenario 200 involving the system 100 of FIG. 1, according to an example implementation. Operating scenario 200 illustrates the flip door portion 120, the linkage 140, and the guardrail portion 130 in an extended configuration. As described herein, the extended configuration could include the flip door portion 120 extending substantially parallel along the reference plane (e.g., a plane parallel to walking surface 12) and the guardrail portion 130 being stowed substantially flush with respect to a top surface of the flip door portion 120.

Additionally illustrated in FIG. 2A are an intermediate pivot 202 and a guardrail linkage attachment 204. The intermediate pivot 202 could include a location along an intermediate portion of the coupler member 144 that is rotatably coupled to the flip door portion 120. The guardrail linkage attachment 204 could represent a rotatable coupling between the second end of the follower member 146 and an intermediate location along the guardrail portion 130.

FIG. 2B illustrates an operating scenario 220 involving the system 100 of FIG. 1, according to an example implementation. Operating scenario 220 illustrates the flip door portion 120, the linkage 140, and the guardrail portion 130 in an intermediate configuration. In some embodiments, the intermediate configuration may include a transitional configuration reached while adjusted between the extended configuration and the retracted configuration, and vice versa.

FIG. 2C illustrates an operating scenario 230 involving the system 100 of FIG. 1, according to an example implementation. Operating scenario 230 illustrates the flip door portion 120, the linkage 140, and the guardrail portion 130 in a retracted configuration. The retracted configuration could include the flip door portion 120 disposed substantially perpendicular to the reference plane (e.g., the flip door portion 120 could be oriented perpendicular to the walking surface 12) and the guardrail portion 130 extending away from the flip door portion 120. That is, in some embodiments, the guardrail portion 130 could unfoldably extend away from the walking surface 12 and could be substantially perpendicular to the walking surface 12.

Figure 3A:
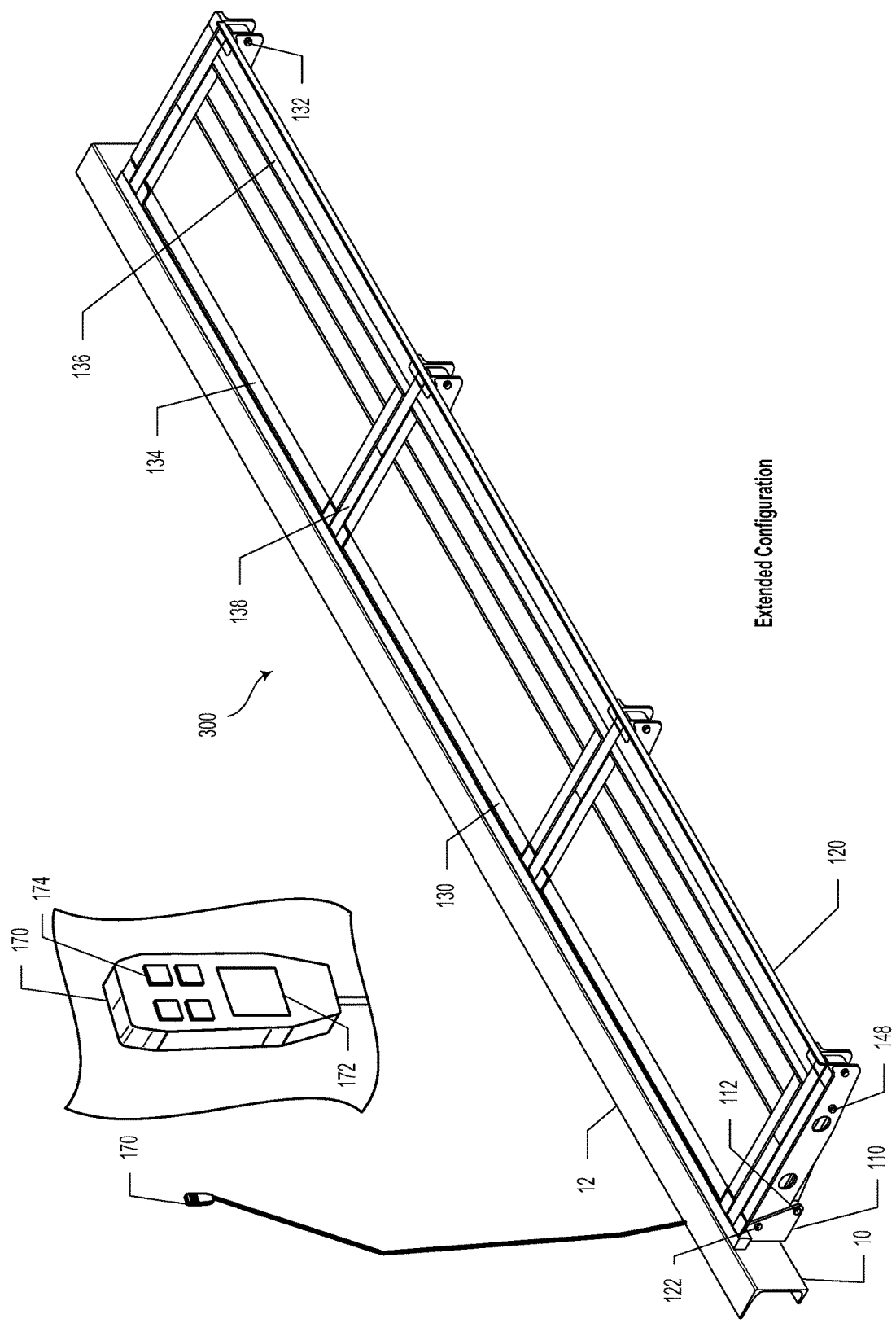
FIG. 3A illustrates the system of FIG. 1, according to an example implementation.
Figure 3B:
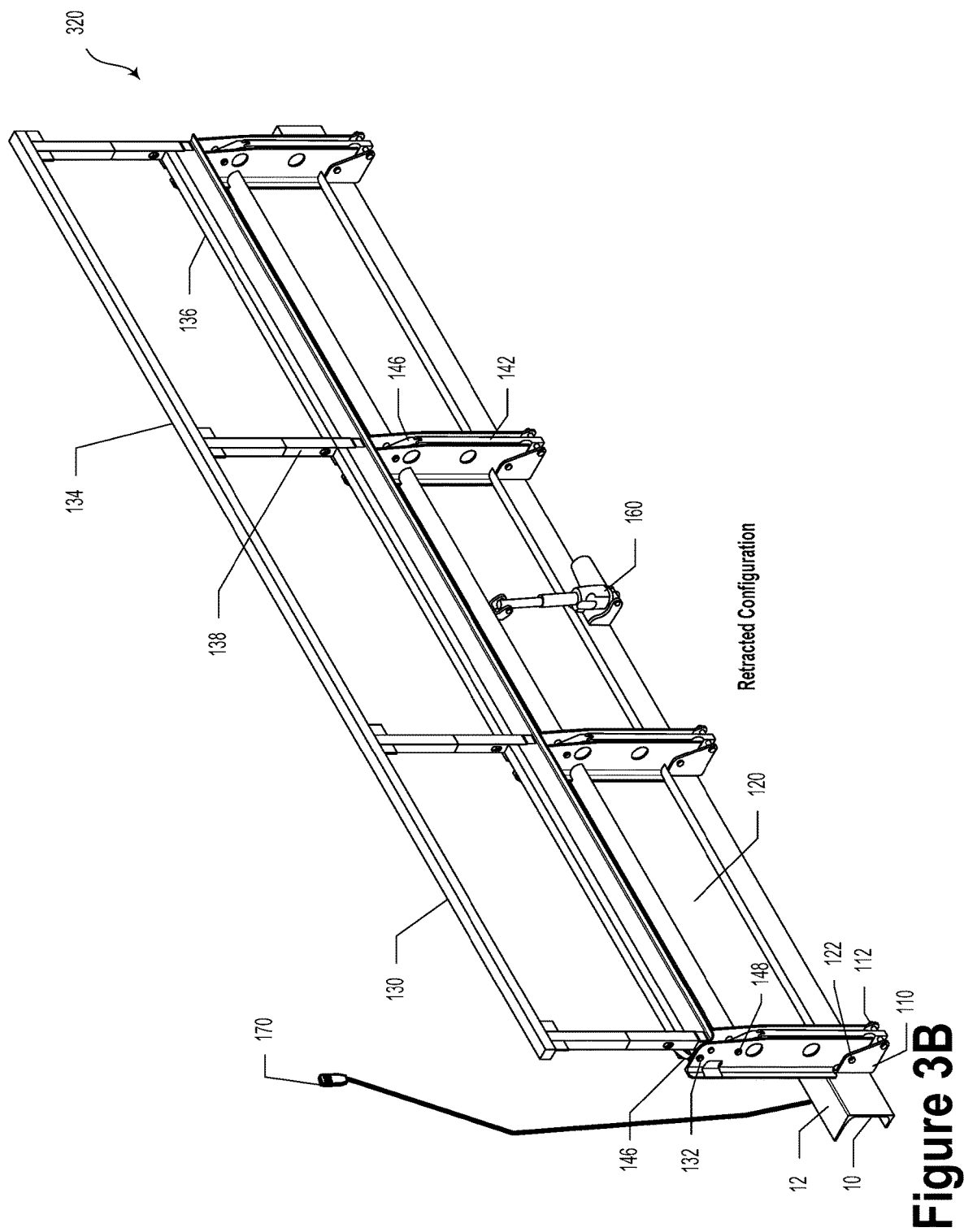
FIG. 3B illustrates the system of FIG. 1, according to an example implementation.

FIGS. 3A-3B illustrate various operating scenarios involving the system 100 of FIG. 1. FIG. 3A illustrates an operating scenario 300 involving the system 100 of FIG. 1, according to an example implementation. In some embodiments, operating scenario 300 could illustrate various elements of the system 100 (e.g., the flip door portion 120, the linkage 140, and the guardrail portion 130) in an extended configuration. As an example, operating scenario 300 could include a remote unit 170. In some embodiments, operating scenario 200 could include more than one remote unit 170. In an example embodiment, the remote unit 170a could include a plurality of buttons 174 and a user interface 172. In example embodiments, the remote unit 170 could be operable to control a configuration of the flip door portion 120, the linkage 140, and the guardrail portion 130. In other embodiments, other remote units could control other movable and/or foldable platforms/guardrails.

FIG. 3B illustrates an operating scenario 320 involving the system 100 of FIG. 1, according to an example implementation. In some embodiments, operating scenario 320 could illustrate various elements of the system 100 (e.g., the flip door portion 120, the linkage 140, and the guardrail portion 130) in a retracted configuration.

Figure 6A:
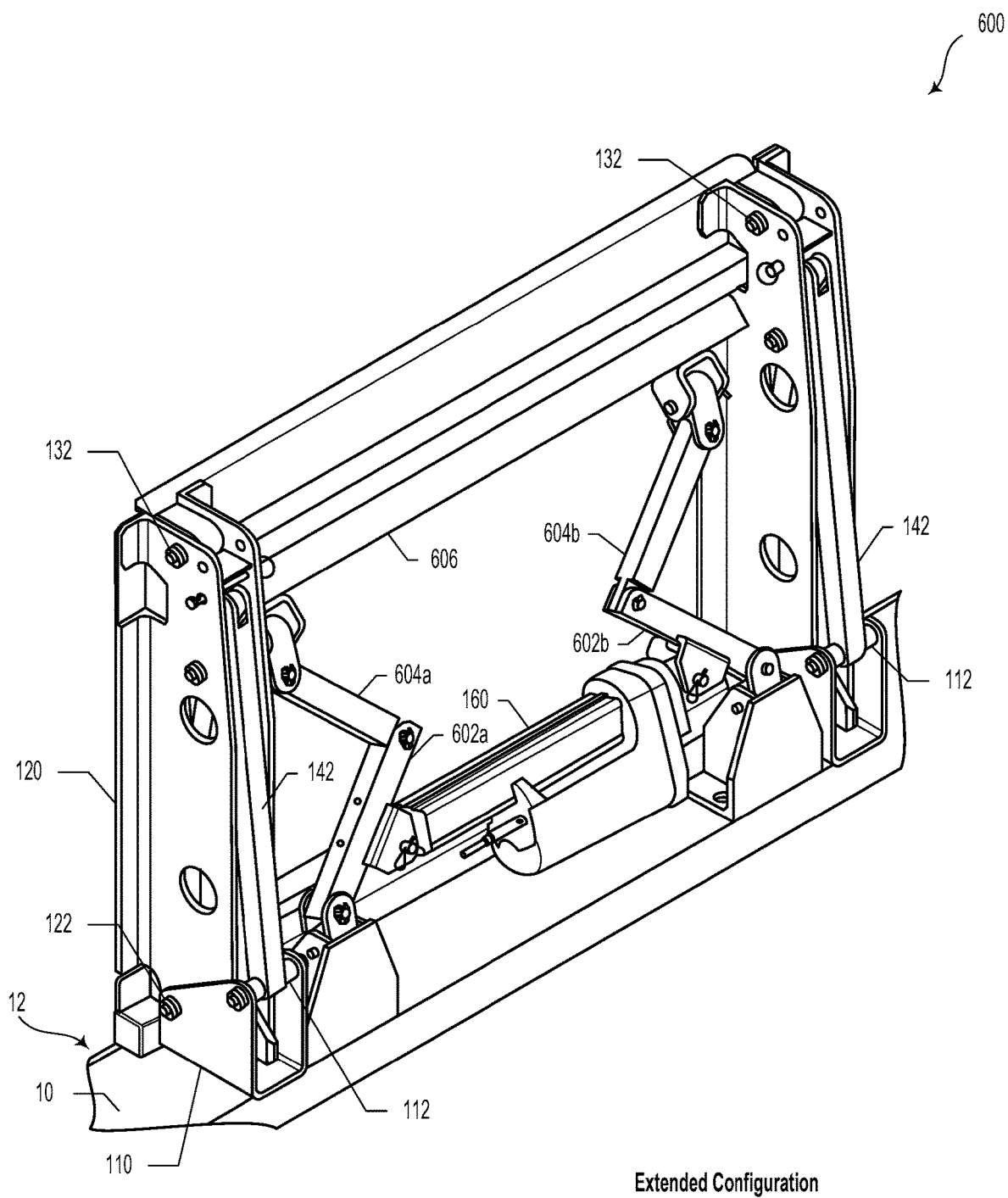
FIG. 6A illustrates the system of FIG. 1, according to an example implementation.

FIGS. 6A and 6B illustrate the system 100 of FIG. 1 according to an example embodiment. For example, FIG. 6A illustrates an underside view of the flip door portion 120 while in an extended configuration 600. In such a configuration, the flip door portion 120 could be adjusted so as to be parallel to the walking surface 12. Furthermore, the guardrail portion 130 could be foldably stowed so as to be flush with a surface of the flip door portion 120.

In some embodiments, actuator 160 could be arranged in a push/pull configuration between two folding arms. For example, the actuator 160 could be coupled to a first member 602a of a first folding arm (602a, 604a) and a first member 602b of a second folding arm (602b, 604b). In such scenarios, the first folding arm (602a, 604a) and the second folding arm (602b, 604b) could be rotatably coupled to the bracket 110 (or another structure connected to the fixed structure 10) and a guardrail rotation member 606. For example, the actuator 160 could be configured to pull the first members 602a and 602b together so as to stow the guardrail portion 130.

FIG. 6B illustrates the system 100 of FIG. 1, according to an example implementation. For example, FIG. 6B could illustrate a retracted configuration 620 of the flip door portion 120 and the guardrail portion 130. In other words, the retracted configuration 620 could include flip door portion 120 being substantially perpendicular to the walking surface 12 and the guardrail portion 130 being rotatably extended in a vertical direction (e.g., extending away from the walking surface 12).

In such scenarios, the actuator 160 could be configured to push the first members 602a and 602b apart so as to extend the guardrail portion 130. It will be understood that other configurations of actuator 160 and/or folding arms (602a, 604a and 602b, 604b) are possible and contemplated. In some embodiments, more than one actuator 160 could be utilized so as to separately actuate the flip door portion 120 with respect to the guardrail portion 130. In other embodiments, a single actuator 160 could actuate the flip door portion 120 and the guardrail portion 130.

III. Example Deck Platforms

FIGS. 4A-4E illustrate deck platforms and various portions thereof that are depicted from various views and arranged in various configurations. The deck platform could include a fixed deck platform portion and a movable deck platform portion that is operable to rotate or fold so as to provide clearance for an aircraft to move along an aircraft assembly line. Other types of deck platforms are possible and contemplated herein.

While "pulsing" the aircraft assembly line, the movable deck platform portion could rotate to a substantially vertical position to provide a protective barrier for personnel with the extended guardrails while rotating the movable deck platform portion up and away from the aircraft fuselage. Once an aircraft is in proper position for work to commence, the movable deck platform portion may be rotated into a substantially horizontal position, and the foldable guardrails described herein could fold into the movable deck platform.

Figure 4A:
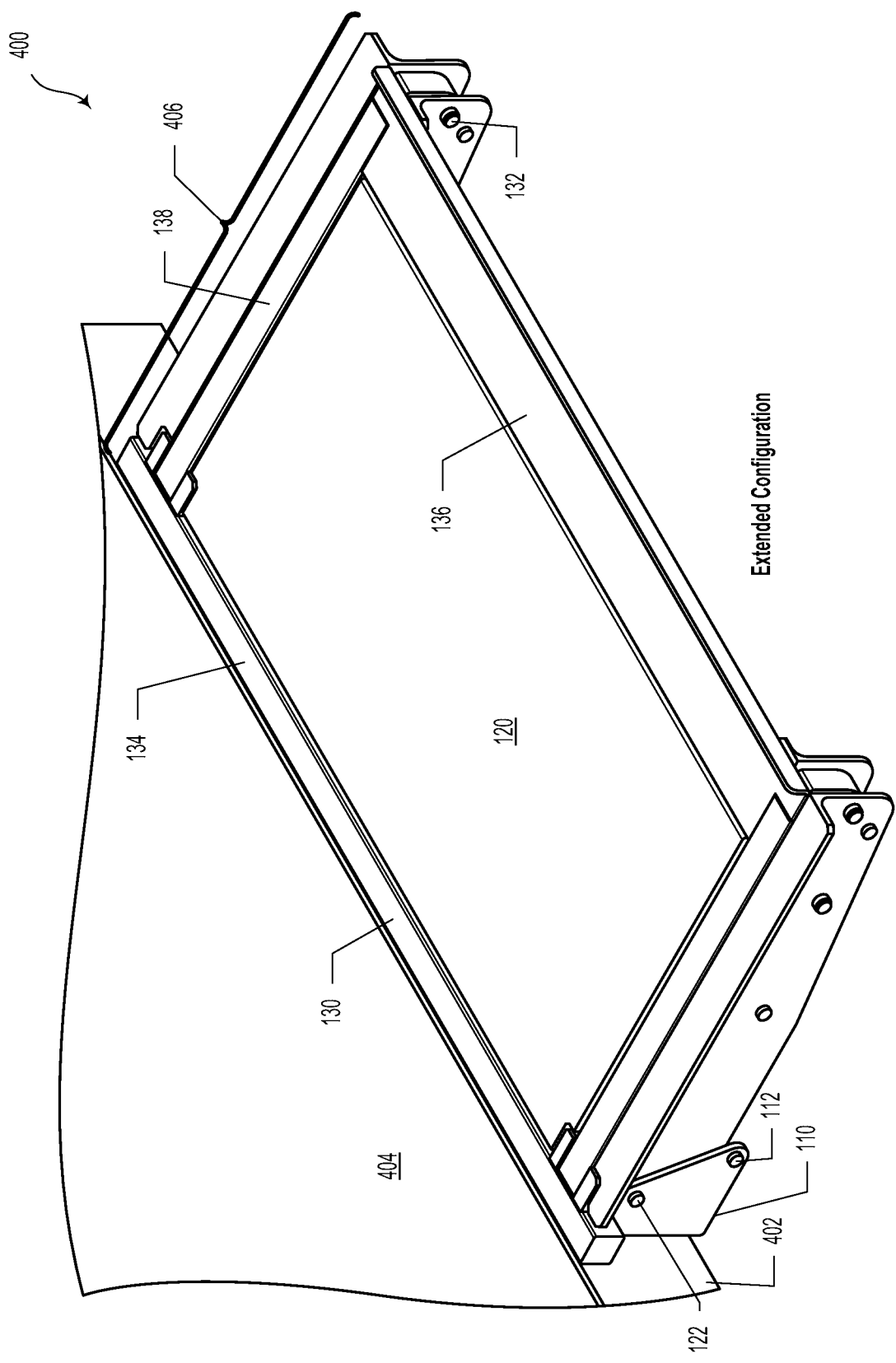
FIG. 4A illustrates a deck platform, according to an example implementation.

FIG. 4A illustrates a deck platform 400 in an extended configuration, according to an example implementation.

Deck platform 400 includes a fixed deck platform portion 402 having a walking surface 404. The deck platform 400 also includes a movable deck platform portion 406.

The movable deck platform portion 406 includes a bracket 110 coupled to the fixed deck platform portion 402.

The movable deck platform portion 406 also includes a flip door portion 120 that is rotatably coupled to the bracket 110.

The movable deck platform portion 406 further includes a guardrail portion 130 that is rotatably coupled to the flip door portion 120.

The movable deck platform portion 406 yet further includes a linkage 140 further coupling the flip door portion 120 to the guardrail portion 130.

The movable deck platform portion 406 additionally includes an actuator 160 configured to controllably adjust a configuration of the flip door portion 120, the linkage 140, and the guardrail portion 130 between an extended configuration and a retracted configuration with respect to the walking surface 404.

As illustrated in FIG. 4A, the walking surface 404 defines a reference plane. In such scenarios, the extended configuration could include the flip door portion 120 extending substantially parallel along the reference plane and the guardrail portion 130 being stowed substantially flush with respect to a top surface of the flip door portion 120.

Figure 4B:
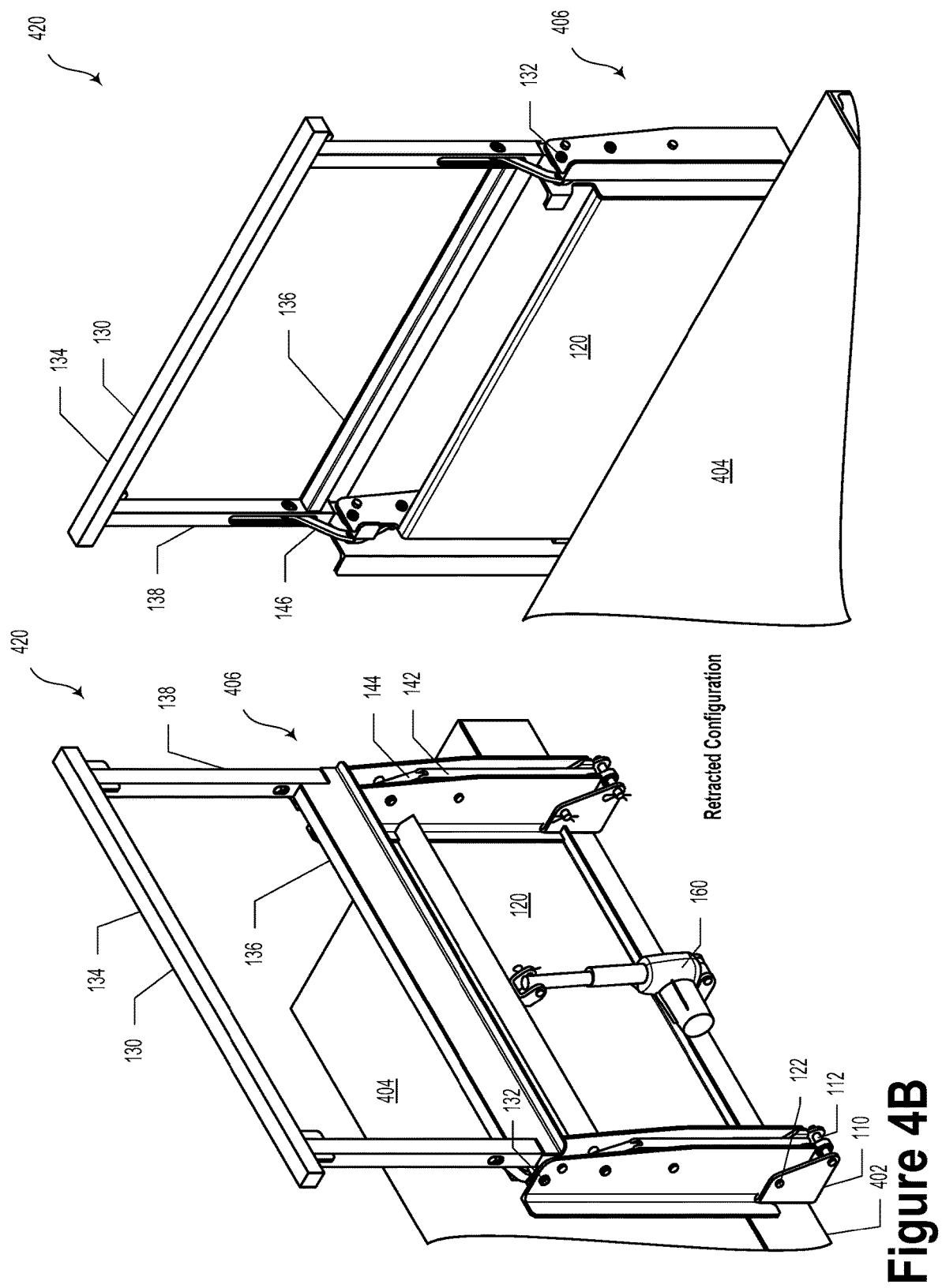
FIG. 4B illustrates a deck platform, according to an example implementation.

FIG. 4B illustrates oblique views of a deck platform 420 in a retracted configuration, according to an example implementation. As illustrated in FIG. 4B, the linkage 140 could include a crank member 142, a coupler member 144, and a follower member 146. A first crank member end is rotatably coupled to the bracket 110 by way of at least one bracket pin 112. A second crank member end is rotatably coupled to a first coupler member end. A second coupler member end is rotatably coupled to a first follower member end. The coupler member 144 is rotatably coupled to the flip door portion 120 at an intermediate pivot between the first coupler member end and the second coupler member end. A second follower member end is rotatably coupled to the guardrail portion 130.

In examples where the walking surface 404 defines a reference plane, the retracted configuration could include the flip door portion 120 disposed substantially perpendicular to the reference plane and the guardrail portion 130 extending away (e.g., vertically) from the flip door portion 120.

Figure 4C:
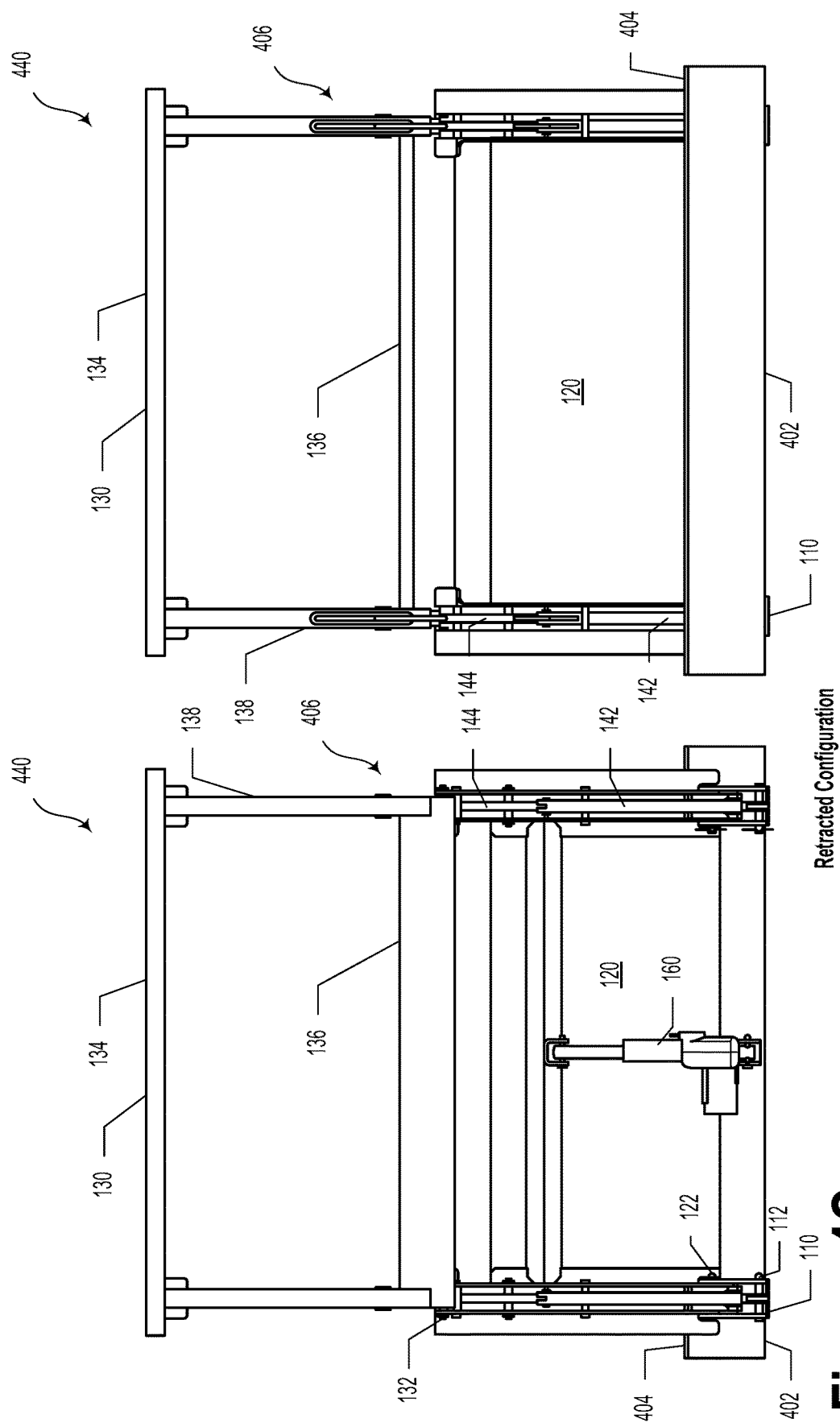
FIG. 4C illustrates a deck platform, according to an example implementation.

FIG. 4C illustrates front and back views of deck platform 440 in a retracted configuration, according to an example implementation.

Figure 4D:
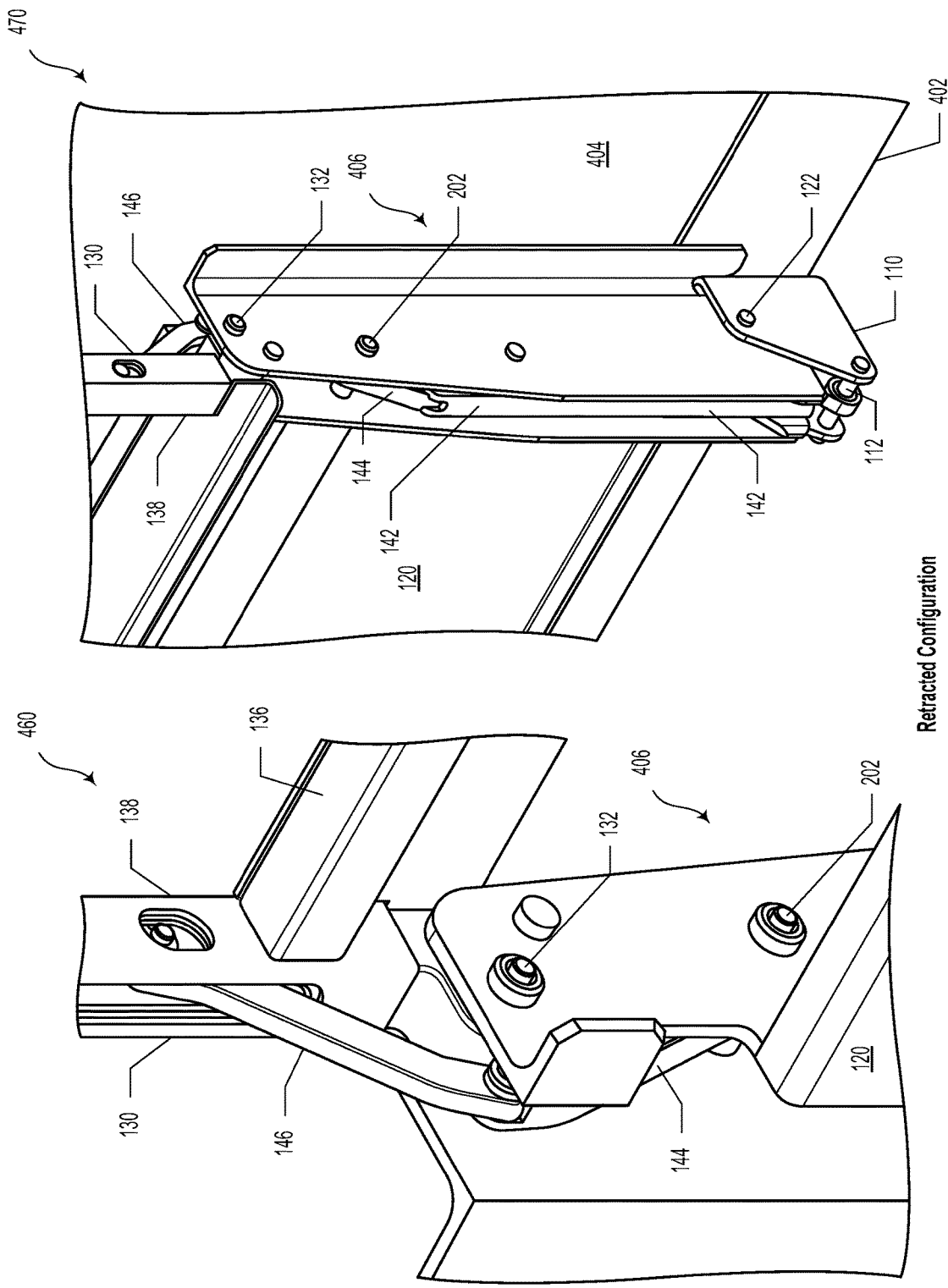
FIG. 4D illustrates a deck platform, according to an example implementation.

FIG. 4D illustrates close-up views of various portions 460 and 470 of a deck platform (e.g., deck platform 420) in a retracted configuration, according to an example implementation.

Figure 4E:
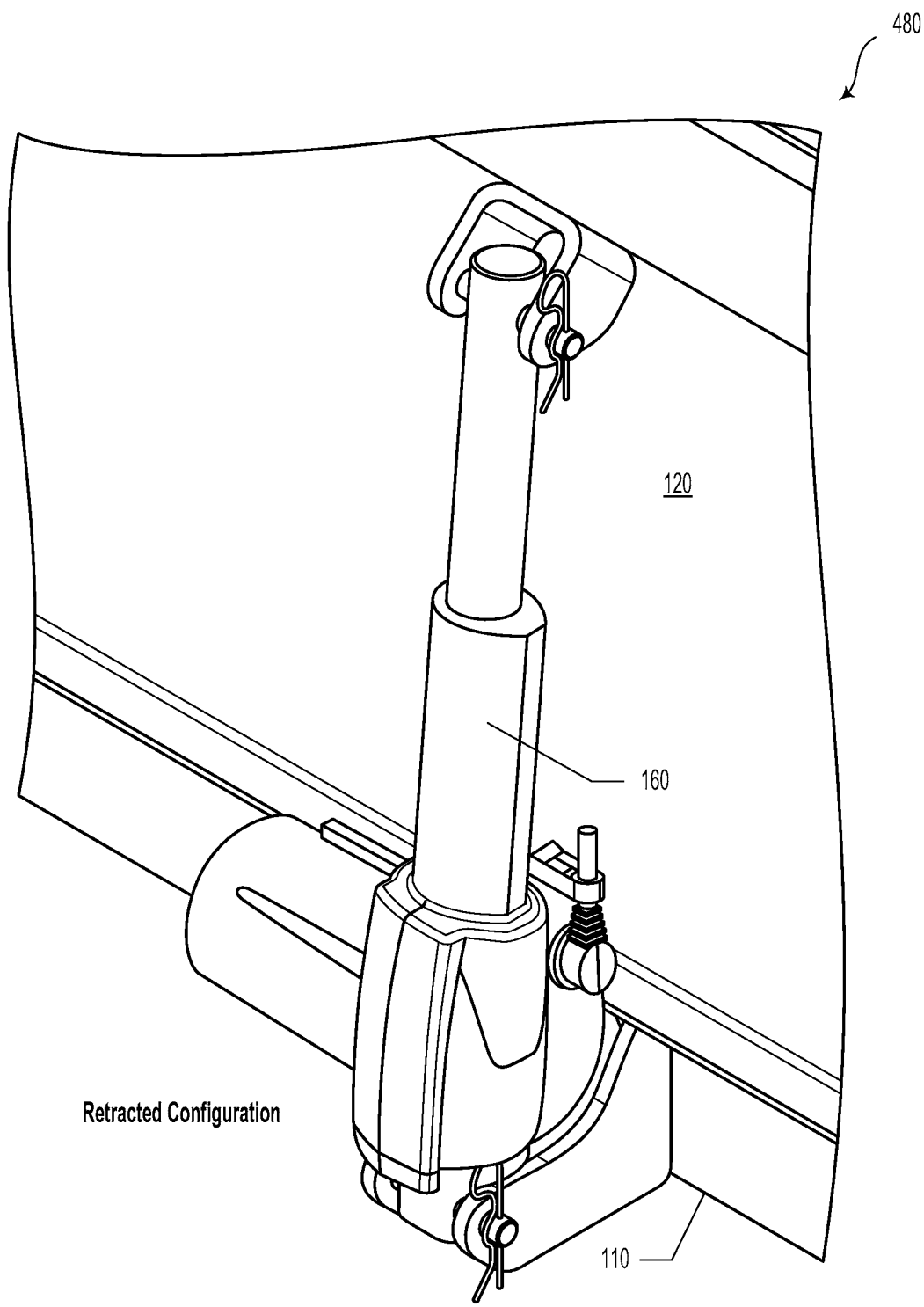
FIG. 4E illustrates a deck platform, according to an example implementation.

FIG. 4E illustrates a close-up view of a portion of a deck platform (e.g., deck platform 420), according to an example implementation. For example, FIG. 4E may illustrate how actuator 160 couples to the flip door portion 120 and the bracket 110. Note that the actuator 160 could alternatively be coupled between the flip door portion 120 and the fixed deck platform portion 402.

IV. Example Methods

Figure 5:
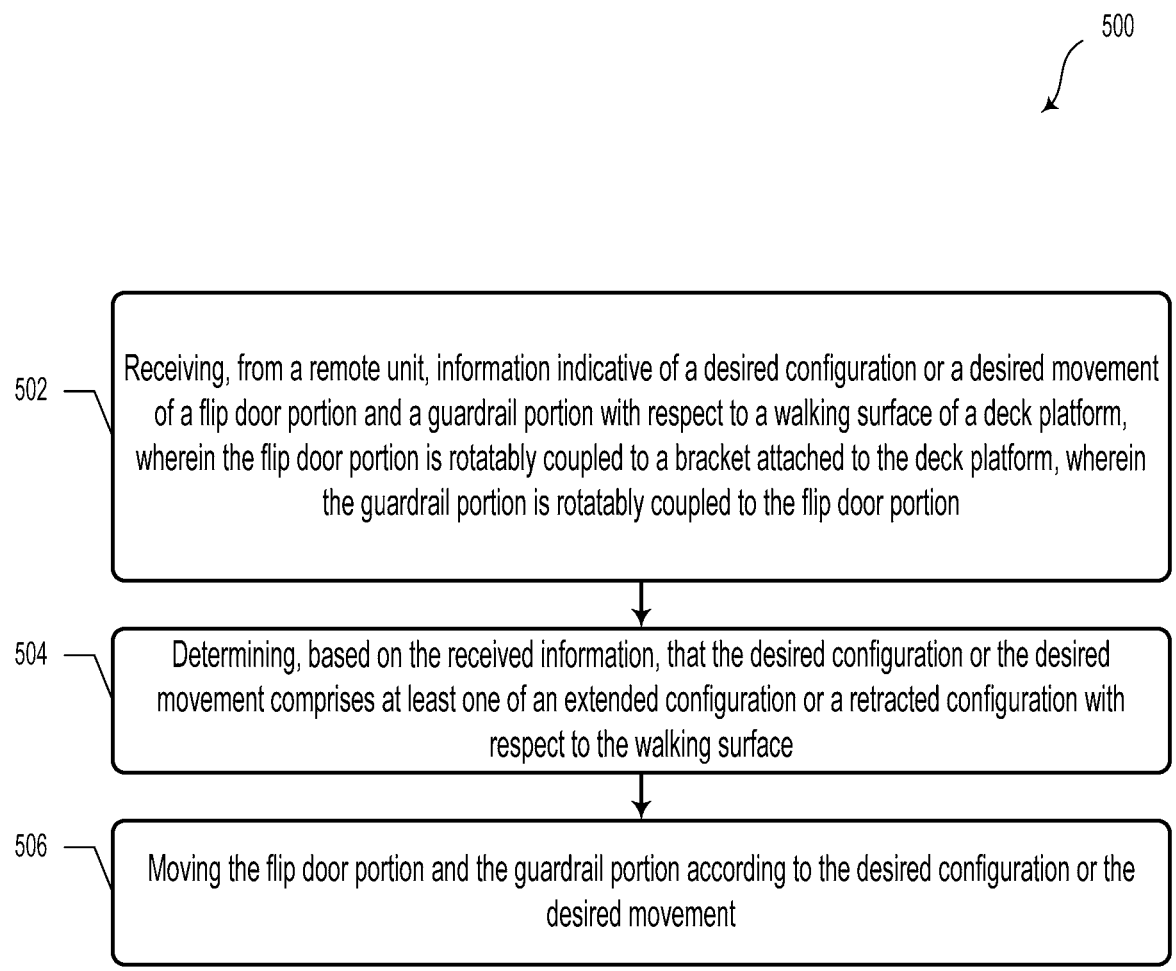
FIG. 5 illustrates a method, according to an example implementation.

FIG. 5 illustrates a method 500, according to an example implementation. Method 500 may involve elements of system 100 and/or deck platforms 400, 420, and 440 as illustrated and described in reference to FIGS. 1, 4A, 4B, and 4C. While FIG. 5 illustrates certain blocks or steps of method 500 as following a specific order, it will be understood that some blocks or steps could be omitted and/or other blocks or steps could be included. Furthermore, the blocks or steps could be carried out in a different order, in parallel (e.g., concurrently), and/or repeated. In some embodiments, at least some blocks of method 500 could be carried out, at least in part, by controller 150, as illustrated and described in reference to FIG. 1.

Block 502 includes receiving, from a remote unit, information indicative of a desired configuration or a desired movement of a flip door portion and a guardrail portion with respect to a walking surface of a deck platform. In such scenarios, the flip door portion is rotatably coupled to a bracket attached to the deck platform and the guardrail portion is rotatably coupled to the flip door portion. For example, some embodiments could include receiving, from a remote unit (e.g., remote unit 170 as illustrated and described in reference to FIG. 1), information indicative of a desired configuration or a desired movement of the flip door portion and the guardrail portion with respect to the walking surface of the deck platform.

The information about the desired configuration or the desired movement could include a signal from a user interaction, which could include a user pushing a button, touching a touchscreen, moving a switch, a voice command, etc. For example, the remote unit could include two buttons—a first button to extend the flip door portion and a second button to retract the flip door portion (and extend the guardrail portion). In response to a user pushing the button to extend the flip door portion, the remote unit may transmit the desired movement (extend the flip door portion) to an actuator controller or another type of control system. Similarly, in response to a user pushing the button to retract the flip door portion, the remote unit may transmit the desired movement (retract the flip door portion) to an actuator controller or another type of control system. In some examples, the signal to retract or extend the flip door portion may be transmitted while the user is pushing the corresponding button on the remote unit. For instance, a user may be able to control an amount of movement of the flip door portion by releasing a button once the flip door portion has reached a desired configuration (e.g., an intermediate configuration, etc.).

In other examples, the received information could include a desired configuration (e.g., fully retracted flip door portion or fully extended flip door portion). In such scenarios, a user need only push the corresponding button (or touchscreen icon) once to provide a signal relating to the desired configuration.

The information about the desired configuration or the desired movement could also include a signal from a computing system. For example, the signal could include an automated retraction command or an automated extension command. Additionally or alternatively, the information about the desired configuration or the desired movement could be provided according to a predetermined schedule and/or based on a planned movement of an aircraft, personnel shift change, among other possibilities.

Block 504 includes determining, based on the received information, that the desired configuration or the desired movement includes at least one of an extended configuration or a retracted configuration with respect to the walking surface. In some embodiments, determining that the desired configuration or the desired movement includes at least one of the extended or retracted configurations could include comparing the received information to values stored in a look up table or another type of stored value or configuration.

Block 506 includes moving the flip door portion and the guardrail portion according to the desired configuration or the desired movement.

In some embodiments, the walking surface defines a reference plane. In such scenarios, the extended configuration includes the flip door portion extending substantially parallel along the reference plane and the guardrail portion being stowed substantially flush with respect to a top surface of the flip door portion. Furthermore, the retracted configuration includes the flip door portion disposed substantially perpendicular to the reference plane and the guardrail portion extending away from the flip door portion.

In some embodiments, method 500 could include receiving, from at least one limit switch, information indicative of the flip door portion, the guardrail portion, and/or the actuator reaching a position limit. In such scenarios, method 500 could include, responsive to receiving the information indicative of the flip door portion, the guardrail portion, and/or the actuator reaching a position limit, causing the actuator to stop moving. In some embodiments, the limit switch could include a pressure sensor or contact switch attached to at least one of the flip door portion, the guardrail portion, and/or the actuator.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system comprising:
   a bracket configured to be coupled to a fixed structure having a walking surface, wherein the walking surface defines a reference plane;
   a flip door portion rotatably coupled to the bracket and having an indentation;
   a guardrail portion rotatably coupled to the flip door portion;
   a linkage further coupling the flip door portion to the guardrail portion; and
   an actuator configured to controllably adjust a configuration of the flip door portion, the linkage, and the guardrail portion between an extended configuration and a retracted configuration with respect to the walking surface,
   wherein the retracted configuration comprises the flip door portion disposed substantially perpendicular to the reference plane and the guardrail portion extending away from the flip door portion,
   wherein the actuator is coupled to a first member of a first folding arm and a first member of a second folding arm,
   wherein the first folding arm and the second folding arm are rotatably coupled to the bracket and a guardrail rotation member,
   wherein the actuator is configured to pull the first member of the first folding arm and the first member of the second folding arm together to stow the guardrail portion, and is further configured to push the first member of the first folding arm and the first member of the second folding arm apart to extend the guardrail portion, and
   wherein based on the flip door portion, the linkage, and the guardrail portion being in the extended configuration, the linkage and guardrail portion are hidden within the indentation.

2. The system of claim 1, wherein the flip door portion is rotatably coupled to the bracket at a flip door pivot.

3. The system of claim 2, wherein the linkage is coupled to the bracket by way of at least one bracket pin.

4. The system of claim 1, wherein the linkage comprises a counter-rotating pin, wherein the flip door portion comprises at least one pin stop, wherein while in the retracted configuration, the counter-rotating pin is configured to engage the pin stop.

5. The system of claim 1, wherein the extended configuration comprises the flip door portion extending substantially parallel along the reference plane and the guardrail portion being stowed substantially flush with respect to a top surface of the flip door portion.

6. The system of claim 1, further comprising a guardrail support block configured to engage a base portion of the guardrail portion while in the retracted configuration so as to prevent rotation of the guardrail portion in at least one direction.

7. The system of claim 1, wherein the guardrail portion comprises:
   a top rail;
   a base rail; and
   a plurality of posts coupled to the top rail and the base rail.

8. The system of claim 1, wherein the actuator comprises an electric ball-screw linear actuator comprising an actuator arm with a throw range between 100 mm to 300 mm.

9. The system of claim 1, further comprising a remote unit configured to control a position of the actuator, wherein the remote unit comprises a wired remote controller having a user interface, and wherein the user interface comprises at least one button.

10. The system of claim 1, further comprising a controller, wherein the controller executes instructions so as to carry out operations, the operations comprising:
    responsive to receiving information indicative of an extension command, causing the actuator to move the flip door portion, the linkage, and the guardrail portion into the extended configuration; and
    responsive to receiving information indicative of a retraction command, causing the actuator to move the flip door portion, the linkage, and the guardrail portion into the retracted configuration.

11. The system of claim 10, further comprising at least one limit switch, wherein the at least one limit switch is configured to provide information indicative of the flip door portion, the linkage, or the guardrail portion reaching a position limit, wherein causing the actuator to move the flip door portion, the linkage, and the guardrail portion comprises moving the flip door portion, the linkage, and the guardrail portion until receiving the information indicative of the flip door portion, the linkage, or the guardrail portion reaching the position limit.

12. The system of claim 1, wherein the retracted configuration further comprises the guardrail portion being rotatably extended in a vertical direction away from the flip door portion and the walking surface.

13. The system of claim 1, wherein the actuator comprises a pneumatic actuator.

14. A deck platform comprising:
    a fixed deck platform portion comprising a walking surface, wherein the walking surface defines a reference plane;
    a movable deck platform portion comprising:
        a bracket coupled to the fixed deck platform portion;
        a flip door portion rotatably coupled to the bracket and having an indentation;
        a guardrail portion rotatably coupled to the flip door portion;
        a linkage further coupling the flip door portion to the guardrail portion; and
        an actuator configured to controllably adjust a configuration of the flip door portion, the linkage, and the guardrail portion between an extended configuration and a retracted configuration with respect to the walking surface,
    wherein the retracted configuration comprises the flip door portion disposed substantially perpendicular to the reference plane and the guardrail portion extending away from the flip door portion,
    wherein the actuator is coupled to a first member of a first folding arm and a first member of a second folding arm,
    wherein the first folding arm and the second folding arm are rotatably coupled to the bracket and a guardrail rotation member,
    wherein the actuator is configured to pull the first member of the first folding arm and the first member of the second folding arm together to stow the guardrail portion, and is further configured to push the first member of the first folding arm and the first member of the second folding arm apart to extend the guardrail portion, and
    wherein based on the flip door portion, the linkage, and the guardrail portion being in the extended configuration, the linkage and guardrail portion are hidden within the indentation.

15. The deck platform of claim 14, wherein the extended configuration comprises the flip door portion extending substantially parallel along the reference plane and the guardrail portion being stowed substantially flush with respect to a top surface of the flip door portion.

16. The deck platform of claim 14, wherein the linkage comprises a counter-rotating pin, wherein the flip door portion comprises at least one pin stop, wherein while in the retracted configuration, the counter-rotating pin is configured to engage the pin stop.

17. The deck platform of claim 14, the movable deck platform further comprising a guardrail support block configured to engage a base portion of the guardrail portion while in the retracted configuration so as to prevent rotation of the guardrail portion in at least one direction.

18. The deck platform of claim 14, wherein the guardrail portion comprises:
    a top rail;
    a base rail; and
    a plurality of posts coupled to the top rail and the base rail.

19. The deck platform of claim 14, wherein the retracted configuration further comprises the guardrail portion being rotatably extended in a vertical direction away from the flip door portion and the walking surface.

20. The system of claim 1, wherein the actuator comprises a hydraulic actuator.

* * * * *